United States Patent
Joo et al.

(10) Patent No.: US 11,726,250 B2
(45) Date of Patent: Aug. 15, 2023

(54) BEAM STEERING METHOD AND DEVICE

(71) Applicants: SAMSUNG ELECTRONICS CO., LTD., Suwon-si (KR); The Board of Trustees of the Leland Stanford Junior University, Stanford, CA (US)

(72) Inventors: Wonjae Joo, Seongnam-si (KR); Mark L. Brongersma, Stanford, CA (US); Junghyun Park, Seoul (KR)

(73) Assignees: SAMSUNG ELECTRONICS CO., LTD., Suwon-si (KR); The Board of Trustees of the Leland Stanford Junior University, Stanford, CA (US)

( * ) Notice: Subject to any disclaimer, the term of this patent is extended or adjusted under 35 U.S.C. 154(b) by 257 days.

(21) Appl. No.: 17/101,935

(22) Filed: Nov. 23, 2020

(65) Prior Publication Data
US 2021/0103085 A1   Apr. 8, 2021

Related U.S. Application Data

(63) Continuation of application No. 16/118,033, filed on Aug. 30, 2018, now Pat. No. 10,877,200.
(Continued)

(30) Foreign Application Priority Data

May 9, 2018   (KR) .......................... 10-2018-0053204

(51) Int. Cl.
*G02B 5/32*   (2006.01)
*G02F 1/29*   (2006.01)
(Continued)

(52) U.S. Cl.
CPC ............. *G02B 5/32* (2013.01); *G02B 6/2931* (2013.01); *G02F 1/292* (2013.01); *G03H 1/26* (2013.01);
(Continued)

(58) Field of Classification Search
CPC .......... G02B 26/106; G02B 5/32; G03H 1/26; G03H 1/2645; G03H 1/28;
(Continued)

(56) References Cited

U.S. PATENT DOCUMENTS

| 4,326,800 A | 4/1982 | Fitts |
| 5,202,776 A | 4/1993 | Gesell et al. |

(Continued)

FOREIGN PATENT DOCUMENTS

| JP | 5707147 B2 | 4/2015 |
| JP | 2016-62631 A | 4/2016 |
| KR | 10-1152798 B1 | 6/2012 |

OTHER PUBLICATIONS

Yaqoob, et al., "Free-space wavelength-multiplexed optical scanner demonstration," Sep. 10, 2002, Applied Optics, vol. 41, No. 26, p. 5568-5573.

(Continued)

*Primary Examiner* — Cara E Rakowski
(74) *Attorney, Agent, or Firm* — Sughrue Mion, PLLC (57) ABSTRACT

A beam steering method and device are provided. The beam steering method includes outputting, from a hologram recording medium on which a plurality of signal light beams having different steering information are recorded, signal light beam having specific steering information, by making reference light having a specific characteristic incident on the hologram recording medium. The method further includes obtaining information about an object existing in the external environment based on the output signal light.

18 Claims, 8 Drawing Sheets

Related U.S. Application Data (60) Provisional application No. 62/552,004, filed on Aug. 30, 2017.

(51) Int. Cl.
  *G03H 1/26* (2006.01)
  *G03H 1/28* (2006.01)
  *G03H 1/04* (2006.01)
  *G02B 6/293* (2006.01)

(52) U.S. Cl.
  CPC ............. *G03H 1/2645* (2013.01); *G03H 1/28* (2013.01); *G03H 2001/0473* (2013.01); *G03H 2001/266* (2013.01); *G03H 2222/13* (2013.01); *G03H 2222/14* (2013.01)

(58) Field of Classification Search
  CPC ..... G03H 2001/0473; G03H 2001/266; G03H 2222/13; G02F 1/29; G02F 1/292
  See application file for complete search history.

(56) References Cited

U.S. PATENT DOCUMENTS

| | | | |
|---|---|---|---|
| 5,378,888 A * | 1/1995 | Stappaerts | G03H 1/0005 356/121 |
| 5,390,046 A | 2/1995 | Gesell et al. | |
| 5,550,779 A | 8/1996 | Burr et al. | |
| 5,623,360 A | 4/1997 | Gesell et al. | |
| 5,740,148 A | 4/1998 | Ja | |
| 5,844,701 A | 12/1998 | Campbell et al. | |
| 6,062,479 A | 5/2000 | Dickson et al. | |
| 6,172,777 B1 | 1/2001 | Flood et al. | |
| 6,266,167 B1 | 7/2001 | Klug et al. | |
| 6,330,088 B1 | 12/2001 | Klug et al. | |
| 6,567,046 B2 | 5/2003 | Taylor et al. | |
| 6,661,548 B2 | 12/2003 | Klug et al. | |
| 7,215,472 B2 | 5/2007 | Smith et al. | |
| 7,847,992 B2 | 12/2010 | Klug et al. | |
| 8,200,055 B2 | 6/2012 | Subbaraman et al. | |
| 8,658,332 B2 | 2/2014 | Askham | |
| 8,847,919 B2 | 9/2014 | Krah | |
| 9,582,083 B2 | 2/2017 | Yin | |
| 9,625,878 B2 | 4/2017 | Fontecchio et al. | |
| 2001/0033402 A1 | 10/2001 | Popovich | |
| 2012/0188618 A1 | 7/2012 | Ishii et al. | |
| 2013/0182239 A1 | 7/2013 | Kaiser | |
| 2016/0085212 A1 | 3/2016 | Nishimura et al. | |

OTHER PUBLICATIONS

Herriau, Jean-Pierre, et al., "Optical-Beam Steering for Fiber Array Using Dynamic Holography," Jul. 7, 1986, Journal of Lightwave Technology, vol. Lt-4, No. 7, p. 905-907.

* cited by examiner

BEAM STEERING METHOD AND DEVICE

CROSS-REFERENCE TO RELATED APPLICATIONS

This application is a continuation of U.S. application Ser. No. 16/118,033, filed Aug. 30, 2018, which claims priority from Korean Patent Application No. 10-2018-0053204, filed on May 9, 2018, in the Korean Intellectual Property Office, and U.S. Patent Application No. 62/552,004, filed on Aug. 30, 2017, in the U.S. Patent and Trademark Office, the disclosures of which are incorporated herein in their entirety by reference.

BACKGROUND

1. Field

Apparatuses and methods consistent with exemplary embodiments relate to beam steering methods and devices.

2. Description of the Related Art

There is a growing interest in techniques for measuring distances or directions to objects, identifying objects, terrain, etc., and for detecting the speed, temperature, and material distribution of an object using light. In this regard, studies have been conducted on methods of steering the direction of emitted light.

To steer light in a desired direction, a method of mechanically rotating a light source has been used, as well as a method in which a bundle-type beam emitted from a plurality of unit cells or a plurality of waveguides is steered using an optical phased array (OPA). The method of mechanically rotating the light source uses a motor or a micro electro mechanical system (MEMS), which may increase the volume and cost of a device. The OPA method may steer the beam by electrically or thermally controlling unit cells or waveguides. In the OPA method, a plurality of waveguides are required, which may increase the total volume of a device and cause an error in phase modulation.

SUMMARY

One or more exemplary embodiments may provide beam steering devices having simple structures and beam steering methods.

One or more exemplary embodiments may provide beam steering devices using a beam recorded via a hologram method and beam steering methods.

Additional exemplary aspects and advantages will be set forth in part in the description which follows and, in part, will be apparent from the description, or may be learned by practice of the presented exemplary embodiments.

According to some exemplary embodiments, a beam steering method includes making reference light incident on a hologram recording medium on which a plurality of signal light beams, having different steering information, are recorded in a holographic manner; outputting, to an external environment, a signal light beam having specific steering information that reacts with a characteristic of the reference light, from among the plurality of signal light beams; and obtaining information about an object existing in the external environment using the output signal light.

The outputting of the signal light may include outputting a first signal light beam having first steering information that reacts with a first reference light beam having a first characteristic; and outputting a second signal light beam having second steering information that is different from the first steering information and reacts with a second reference light beam having a second characteristic different from the first characteristic.

The characteristic may include at least one of a wavelength and a phase of light.

The specific steering information may include at least one of an output direction and a divergence angle of the signal light beam.

Information about the object may include at least one of absence or presence of the object, a position of the object, and distance information about the object.

The outputting of the signal light may include outputting a first signal light group comprising a plurality of signal light beams having divergence angles greater than a reference angle; and outputting a second signal light group comprising a plurality of signal light beams having divergence angles less than the reference angle.

The outputting of the first signal light group may include scanning the external environment by outputting the plurality of signal light beams included in the first signal light group in different output directions.

The outputting of the first signal light group may include sequentially outputting one by one the plurality of signal light beams included in the first signal light group.

The obtaining of the information about the object may include determining a target region in which the object exists in the external environment based on the first signal light group.

The outputting of the second signal light group may include scanning the target region by outputting the plurality of signal light beams included in the second signal light group in different output directions.

The obtaining of the information about the object may include obtaining distance information about the object based on the second signal light group.

According to some exemplary embodiments, a beam steering device includes a light source configured to output a plurality of reference light beams having different characteristics; and a hologram recording medium on which a plurality of signal light beams having different steering information are recorded in a holographic manner and configured to scan an external environment by outputting the plurality of signal light beams having different steering information that reacts with a characteristic of each of the plurality of reference light beams incident thereon from the light source.

The hologram recording medium may be configured to output a first signal light beam having first steering information that reacts with a first reference light beam having a first characteristic and to output a second signal light beam having second steering information that is different from the first steering information and reacts with a second reference light beam having a second characteristic different from the first characteristic.

The characteristic may include at least one of a wavelength and a phase of light.

The steering information may include at least one of an output direction and a divergence angle of the signal light beam.

The beam steering device may further include: a processor configured to obtain information about the object existing in the external environment based on the output plurality of signal light beams.

The information about the object may include at least one of absence or presence of the object, a position of the object, and distance information about the object.

The hologram recording medium may be configured to output at least one of a first signal light group comprising a plurality of signal light beams having divergence angles greater than a reference angle and a second signal light group comprising a plurality of signal light beams having divergence angles less than the reference angle.

The hologram recording medium may be configured to output the plurality of signal light beams included in the first signal light group in different output directions.

The processor may be configured to determine a target region in which the object exists in the external environment using the first signal light group and to obtain distance information about the object based on the second signal light group.

BRIEF DESCRIPTION OF THE DRAWINGS

These and/or other exemplary aspects and advantages will become apparent and more readily appreciated from the following description of the exemplary embodiments, taken in conjunction with the accompanying drawings in which.

DETAILED DESCRIPTION

Reference will now be made in detail to exemplary embodiments which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. Most of the terms used herein are general terms that have been widely used in the technical art to which the present disclosure pertains. However, some of the terms used herein may be created reflecting intentions of technicians in this art, precedents, or new technologies. Also, some of the terms used herein may be arbitrarily chosen by the present applicant. In this case, these terms are defined in detail below. Accordingly, the specific terms used herein should be understood based on the unique meanings thereof and the whole context of the present disclosure.

In the present specification, it should be understood that the terms, such as 'including' or 'having,' etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

It will be understood that what is described as 'upper' or an 'on' may include not only being directly on, but also being in a noncontact manner. It will be understood that although the terms "first", "second", etc. may be used herein to describe any of various elements, these elements should not be limited by these terms. These terms are only used to distinguish one element from another.

Hereinafter, exemplary embodiments of the present disclosure will be described in detail with reference to the accompanying drawings. The following exemplary embodiments are intended to illustrate the disclosure and do not limit or restrict the scope of the disclosure. It will be understood by those of ordinary skill in the art that various changes in form and details may be made therein without departing from the spirit and scope of the disclosure as defined by the appended claims.

Figure 1:
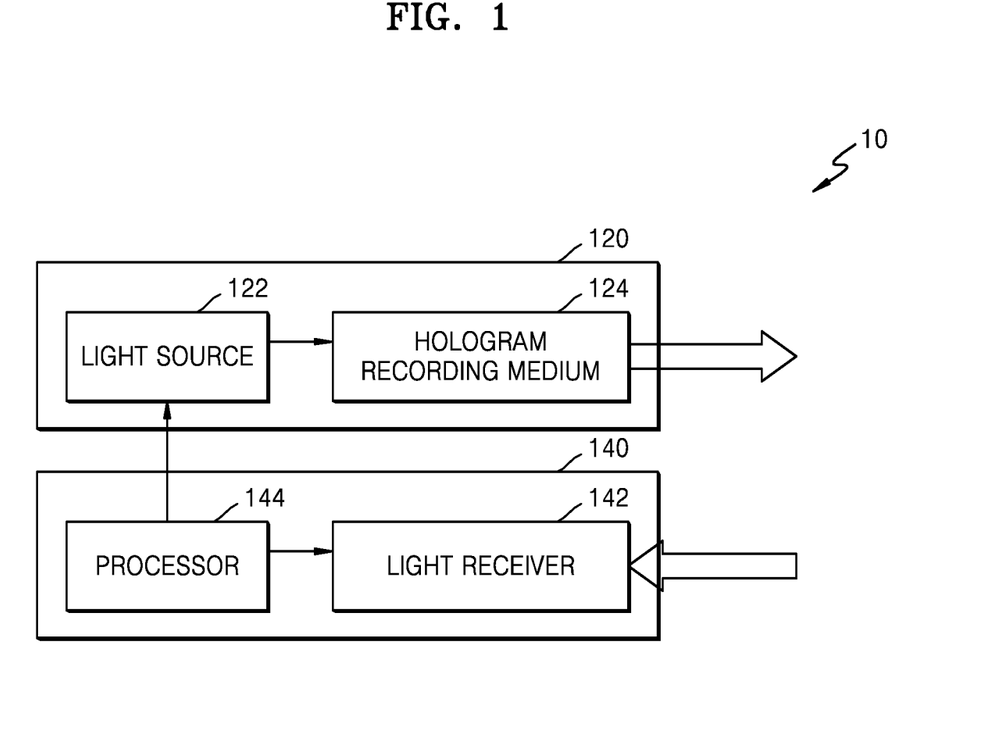
FIG. 1 is a block diagram showing a beam steering device according to an exemplary embodiment.

FIG. 1 is a block diagram showing a beam steering device according to an exemplary embodiment. Referring to FIG. 1, a beam steering device 10 may include a scanning device 120 which scans the external environment using light and a processing device 140 which obtains information about an object existing in the external environment by using light reflected or scattered from the external environment.

The scanning device 120 may include a light source 122 outputting a plurality of light beams having different characteristics and a hologram recording medium 120 which scans the external environment by outputting light that has specific steering information and that interferes with the light output from the light source 122.

The light source 122 may output the plurality of lights having different characteristics. The characteristic may include at least one of a wavelength and a phase. In an exemplary embodiment, the light source 122 may output a plurality of lights having different wavelengths or a plurality of lights having different phases. In another exemplary embodiment, the light source 122 may output a plurality of lights having different wavelengths and phases.

The light source 122 may include a laser diode generating light having high coherence, but is not limited thereto. Since light having some degree of spatial coherence may be sufficiently diffracted and modulated by the hologram recording medium 124, any other light source may be used as long as it emits light having some degree of spatial coherence.

The light source 122 may include sub light sources providing light having different characteristics. In an exemplary embodiment, the light source 122 may include a first sub light source providing light having a first wavelength and a second sub light source providing light having a second wavelength different from the first wavelength.

In another exemplary embodiment, the light source 122 may include a wavelength tunable laser providing light of different wavelengths. The wavelength tunable laser may have a narrow line width and a wide wavelength tuning range. In an exemplary embodiment, the line width may be 100 kHz and the wavelength tuning range may be about 50 to about 80 nm. Accordingly, a single wavelength tunable laser may output a large number of different wavelengths. The wavelength tunable laser may output light of different wavelengths in response to an electrical signal applied thereto. A wavelength band may be about 600 to about 1500 nm. The wavelength tuning may be continuous or discontinuous. Alternatively, the light source 122 may also include a phase modulator providing light of different phases.

Light having different steering information may be recorded on the hologram recording medium 124 via a hologram method. Of the recorded light, light responsive to a characteristic of incident light may be output. For convenience of explanation, a incident on the hologram recording medium 124 may be referred to as reference light, and light output from the hologram recording medium 124 may be referred to as signal light.

The hologram recording medium 124 may include a material on which a plurality of signal light beams Ls may be recorded. In an exemplary embodiment, the material may be a non-volatile material. A greater number of the signal light beams Ls may be recorded on the hologram recording medium 124 according to an increase in the thickness thereof. The thickness of the hologram recording medium 124 may refer to a size of the hologram recording medium 124 in a direction parallel to a normal line of a surface on which the light output from the light source 122 is incident.

The hologram recording medium 124 on which the signal light Ls may be recorded may include various materials, for example, non-linear crystals such as LiNbO3, Photo-Thermo-Refractive (PTR) glass, and organic polymer materials called photopolymers. A dynamic range may be used to determine the capacity of the various materials to record a hologram thereof. The dynamic range may be defined as the number of holograms with a diffraction efficiency of 100% that may be redundantly recorded in a certain thickness of the material. The dynamic range may be increased proportionally to a refractive index size at which maximum modulation per unit thickness is possible. Since the dynamic range of LiNbO3 crystal material is 1 to 2 (cm-1), and one or two signal light beams Ls may be recorded on the LiNbO3 crystal material having a thickness of about 1 mm, it is not indicated to use the LiNbO3 crystal material for the beam steering device 10 according to an exemplary embodiment. The signal light Ls may also be recorded on the PTR glass. However, since one signal light beam Ls may be recorded on the PTR glass material having a thickness of about 1 mm, it may be desirable to increase the thickness of the PTR glass to record a large number of signal light beams Ls.

The hologram recording medium 124 according to an exemplary embodiment may include a material including at least one of photo-polymer and inorganic crystal. The thickness of the hologram recording medium 124 may be about 1 mm to about 10 mm. In an exemplary embodiment, about 190 signal light beams may be recorded on a photo-polymer material having a thickness of about 1 mm as reference light having a bandwidth of about 0.26 nm, about 500 signal light beams may be recorded on photo-polymer material having a thickness of about 3 mm as reference light having a bandwidth of about 0.1 nm, and about 500 signal light beams may be recorded on photo-polymer having a thickness of about 5 mm as reference light having a bandwidth of about 0.05 nm.

Each of the signal light beams Ls recorded on the hologram recording medium 124 may include specific steering information. In an exemplary embodiment, the steering information may include information about at least one of an output direction and a divergence angle of the signal light beam. Thus, the signal light output from the hologram recording medium 124 may include its own steering information. In an exemplary embodiment, a first signal light beam Ls having first steering information including a first output direction and a first diverging angle may be output in the first output direction and at the first diverging angle. Further, each of the signal light beams Ls may have a unique characteristic, for example, a wavelength, a phase, or a modulation characteristic.

The signal light beams Ls may be recorded on the hologram recording medium 124 by a reference light in a holographic method and may be outputted from the hologram recording medium 124 by a light having the same characteristic as the reference light. In an exemplary embodiment, when the first signal light Ls, having the first steering information, and first reference light, having the first characteristic, are incident on the hologram recording medium 124, the first signal light Ls may be recorded on the hologram recording medium 124 in a holographic method of recording interference patterns of the first signal light and the first reference light. The holographic method may include any one of a transmission method, a reflection method, and a floating method. Then, when light, having the same characteristic as the first reference light, is incident on the hologram recording medium 124, only the first signal light beam Ls is output from among the signal light beams recorded on the hologram recording medium 124. The first signal light Ls, that reacts only with light having the first characteristic, is be output, but is not output when light having a second characteristic, different from the first characteristic, is incident on the hologram recording medium.

Thus, the beam steering device 10 according to an exemplary embodiment may scan the external environment by making light, having different characteristics, incident on the hologram recording medium 124 and by thereby outputting signal light having different steering information. As described above, when the external environment is scanned using the hologram recording medium 124, it is not necessary to provide a separate mechanical device for adjusting an output direction of the light or the like.

The processing device 140 may acquire information about an object in the external environment using the signal light Ls output from the scanning device 120. The processing device 140 may include a light receiver 142 receiving the signal light Ls output from the scanning device 120 and scattered or reflected by an object and a processor 144 acquiring information about the object based on a result received from the light receiver 142.

The light receiver 142 may include a light detector outputting an electric signal corresponding to the light received, for example, a current, a current-to-voltage conversion circuit converting the current output from the light detector into a voltage, and an amplifier amplifying amplitude of the voltage, etc. In addition, the light receiver 142 may further include a lens condensing the light reflected from the object and a filter filtering an electric signal of a specific frequency, for example, a high pass filter, etc.

The light detector may be a light receiving device. In an exemplary embodiment, the light detector may include an Avalanche Photo Diode (APD) or a Single Photon Avalanche Diode (SPAD). The light receiver 142 may have the specific circuit configuration of an Analog Front End (AFE), a Time Digital Counter (TDC), etc. according to which of an APD and a SPAD is included in the light receiver 142. Such a specific circuit configuration may be a general technology, and thus a detailed description thereof will be omitted.

The processor 144 may obtain information about the object based on the electrical signal received from the light receiver 142. The processor 144 may obtain the information about the object by detecting the peak of the electrical signal. In an exemplary embodiment, the processor 144 may detect the peak by detecting a width of the electrical signal in an analog manner. Alternatively, the processor 144 may detect the peak by converting the electrical signal into a digital signal and then detecting rising and falling edges of the digital signal. Alternatively, the processor 144 may detect the peak using a Constant Fraction Discriminator (CFD) method of dividing the electric signal into a plurality of signals, inverting and time-delaying some of the electric signals, combining the inverted and delayed electric signals with the remaining signals, and detecting a zero cross point. The processor 144 may further include a comparator to output the detected peak as a pulse signal.

The processor 144 may determine whether an object is present based on whether the peak is detected. Then, the processor 144 may determine a position of the object by determining the signal light corresponding to the light of which the peak is detected. In an exemplary embodiment, the signal light may be identified by a modulation characteristic of the light of which the peak is detected. The processor 144 may specify steering information of the signal light from the characteristic of the detected light based on a lookup table matching the characteristic and the steering information and may determine the position of the object using the steering information of the specified signal light. In addition, the processor 144 may determine distance information regarding the object, that is, depth information of the object, based on a detection time of the detected peak and an output time of the signal light output from the scanning device 120. A distance measuring method using the peak is a common technique, and thus a detailed description thereof will be omitted.

The hologram recording medium 124 according to an exemplary embodiment may output signal light (hereinafter, referred to as 'wide range signal light') having a divergence angle greater than a reference angle and may also output signal light (hereinafter, referred to as 'narrow range signal light') having a divergence angle less than the reference angle. The reference angle may be defined by a designer.

Since wide range signal light has a large divergence angle, the external environment of a wide range may be scanned with the wide range signal light. In an exemplary embodiment, the wide range signal light may be used to determine whether an object is present or to identify a target region within the external environment within which the object is present. Since narrow range signal light has a small divergence angle, a partial region of the external environment, for example, the target region, may be scanned with the narrow range signal light. The narrow range signal light may be used to obtain more precise information of the object, for example, distance information regarding the object. Also, the number of the narrow range signal light beams may be greater than that of the wide range signal light. In an exemplary embodiment, wide range signal light and narrow range signal light may be allocated such that about 50 narrow range signal light beams are output in a region within which one wide range signal light beam is output.

Figure 2A:
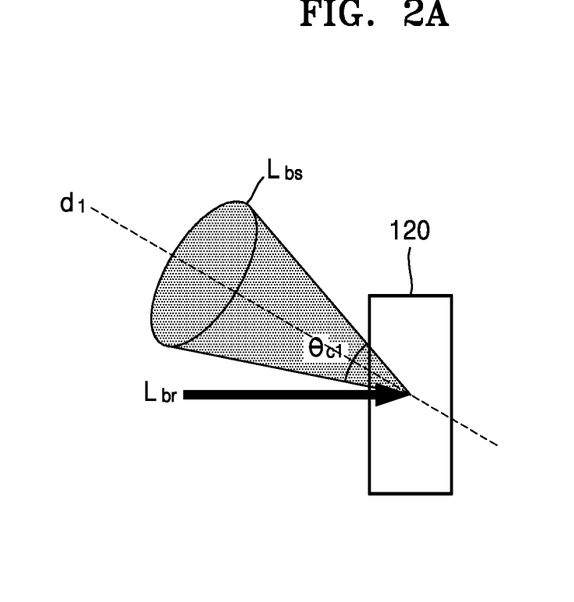
FIGS. 2A and 2B are reference diagrams for explaining wide range signal light according to an exemplary embodiment.
Figure 2B:
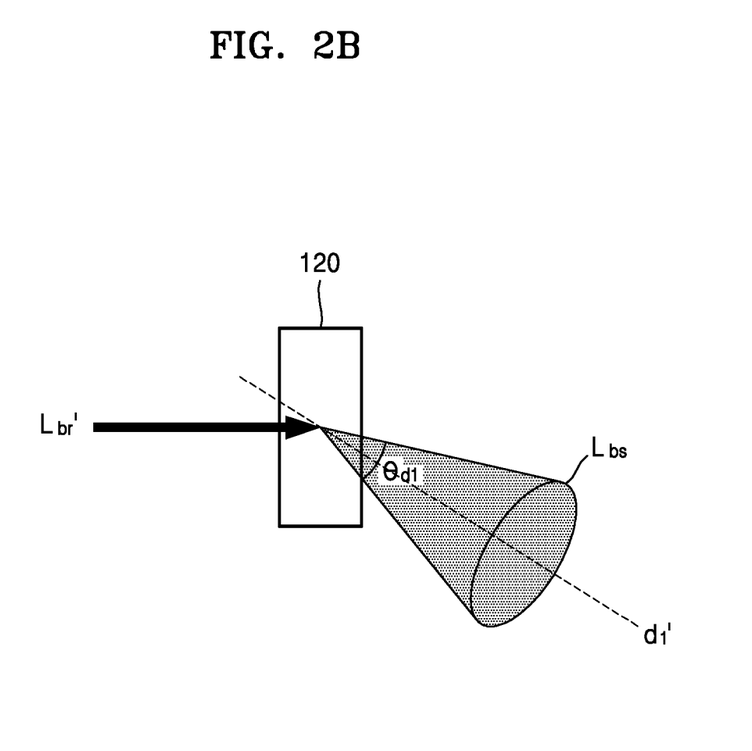

FIGS. 2A and 2B are reference diagrams for explaining wide range signal light according to an exemplary embodiment. Referring to FIG. 2A, wide range signal light Lbs having a convergence angle $\theta c1$, greater than a reference angle, may be recorded on the hologram recording medium 124 using reference light Lbr. The wide range signal light Lbs may be irradiated while the reference light Lbr is irradiated onto the hologram recording medium 124. Then, an interference pattern between the reference light Lbr and the wide range signal light Lbs may be recorded, and thus the wide range signal light Lbs may be recorded on the hologram recording medium 124.

As shown in FIG. 2B, when light Lbr,' having the same characteristic as the reference light Lbr, is irradiated onto the hologram recording medium 124 on which the wide range signal light Lbs has been recorded, the wide range signal light Lbs recorded with the interference pattern may be output from the hologram recording medium 124. A divergence angle $\theta d1$ of the output wide range signal light Lbs may be the same as the convergence angle $\theta c1$ with which the wide range signal light Lbs was recorded. An output direction d1' of the output wide range signal light Lbs may be the same as an incidence direction d1 with which the wide range signal light Lbs was recorded. In this way, wide range signal light Lbs, that reacts with only the light Lbr' having the same characteristic as the reference light Lbr with which the wide range signal light Lbs was recorded, may be output but may not be output with respect to light having a different characteristic. Therefore, steering information of the wide range signal light Lbs output from the hologram recording medium 124 may be specified as the incidence direction d1 and the convergence angle $\theta c1$ of the wide range signal light Lbs incident on the hologram recording medium 124, and the wide range signal light Lbs may be output only by a light having a specific characteristic.

Figure 3:
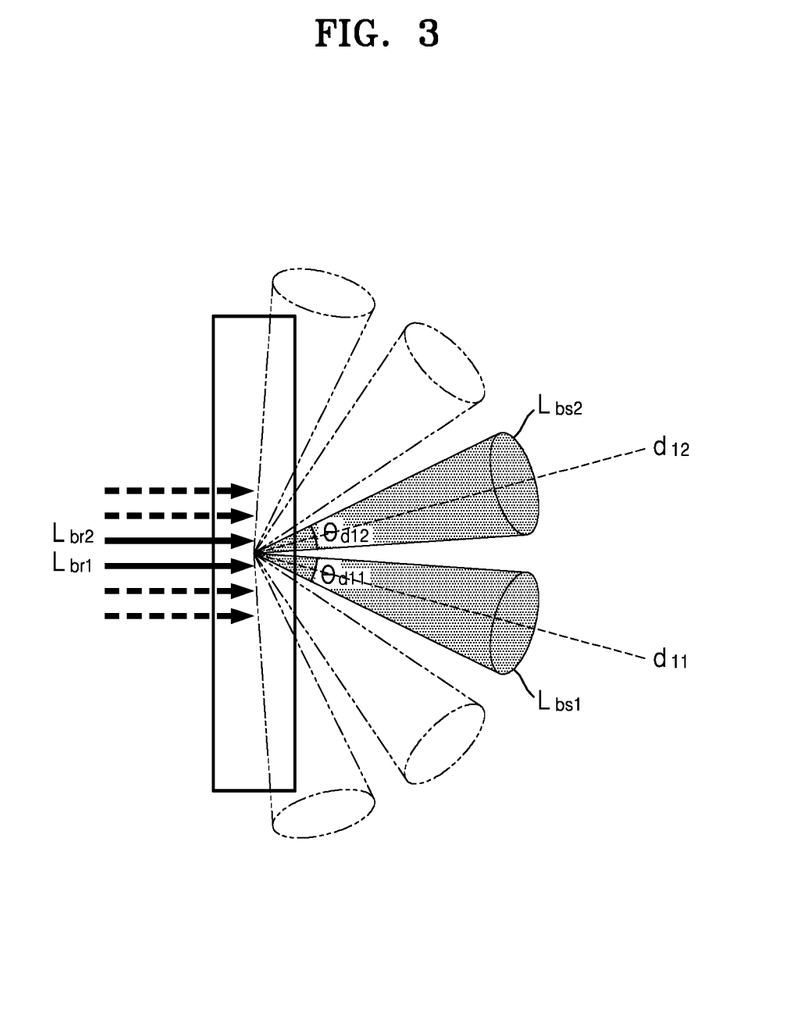
FIG. 3 is a reference diagram for explaining a method of scanning the external environment by using wide range signal light according to an exemplary embodiment.

FIG. 3 is a reference diagram for explaining a method of scanning the external environment using wide range signal light according to an exemplary embodiment. A plurality of wide range signal light beams, having different steering information, may be recorded on the hologram recording medium 124 shown in FIG. 3. When a plurality of reference light beams having different characteristics are irradiated onto the hologram recording medium 124 of FIG. 3, wide range signal light beams that respectively react with the reference light beams, from among the plurality of wide range signal light beams may be diffracted and output. When the plurality of reference light beams having different characteristics are sequentially incident onto the hologram recording medium 124 one by one, the plurality of wide range signal light beams that respectively reacts with the reference light beams may be sequentially output one by one. Each of the plurality of wide range signal light beams may have different steering information and may be output in an output direction and at a divergence angle corresponding to the steering information.

In an exemplary embodiment, when the first reference light beam Lbr is incident on the hologram recording medium 124, a first wide range signal light beam Lbs1, recorded by forming an interference pattern together with the first reference light beam Lbr, may be output in the first output direction d11 and at the first divergence angle $\theta d11$. When a second reference light beam Lbr1, having a different characteristic from that of the first reference light beam Lbr1, is incident on the hologram recording medium 124, a second wide range signal light beam Lbs2, recorded by forming an interference pattern together with the second reference light beam Lbr1, may be output in the second output direction d12 and at the second divergence angle $\theta d12$. The second output direction d12 may be different from the first output direction d11. The first divergence angle $\theta d11$ and the second divergence angle $\theta d12$ may be the same or different, whereas both the first divergence angle θd11 and the second divergence angle θd12 may be greater than a reference angle.

In an exemplary embodiment, when an external environment of 180 degrees in a forward direction is scanned using wide range signal light, the hologram recording medium 124 may output 6 wide range signal light beams, each having an angle of 30 degrees in an output direction of the neighboring wide range signal light beams and having a divergence angle of 30 degrees or more, and thus the external environment may be scanned. The number of the wide range signal light beams and the steering information may be determined according to an application.

Figure 4A:
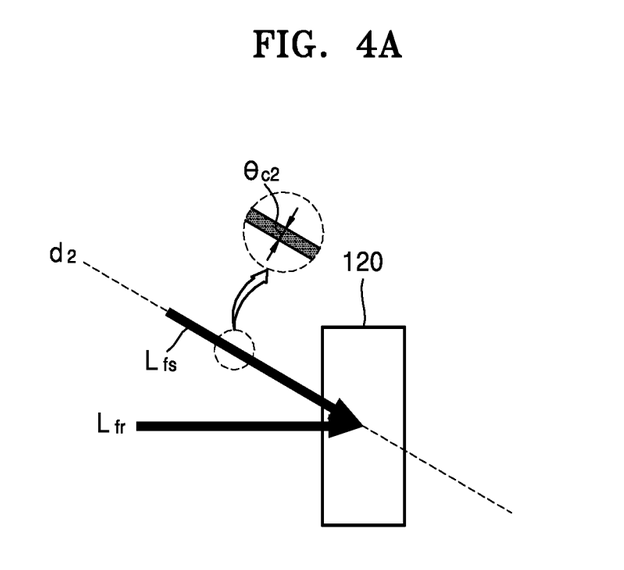
FIGS. 4A and 4B are reference drawings for explaining narrow range signal light according to an exemplary embodiment.
Figure 4B:
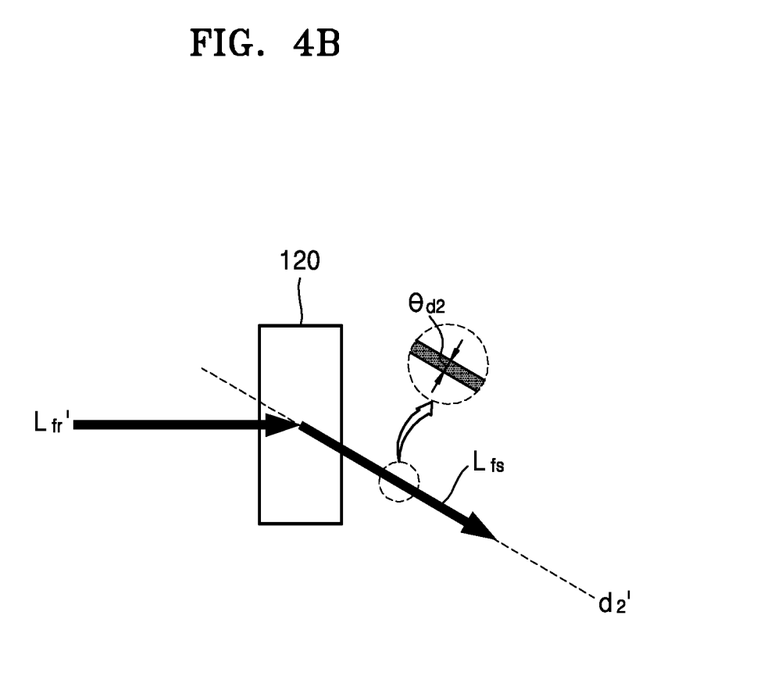

FIGS. 4A and 4B are reference drawings for explaining narrow range signal light Lfs according to an exemplary embodiment. Referring to FIG. 4A, the narrow range signal light Lfs having a convergence angle θc2, less than a reference angle, may be recorded on the hologram recording medium 124 using the reference light Lfr. A first narrow range signal light beam Lfs may be incident on the hologram recording medium 124 in a state in which the reference light Lfr is irradiated onto the hologram recording medium. Then, the narrow range signal light beam Lfs may be recorded on the hologram recording medium 124 by recording an interference pattern of the reference light beams Lfr and the narrow range signal light beams Lfs.

As shown in FIG. 4B, when light Lfr' having the same characteristic as the reference light Lfr with which the narrow range signal light Lfs was recorded on the hologram recording medium 124 is incident on the hologram recording medium 124, the narrow range signal light beam Lfs, recorded in the interference pattern, is be output from the hologram recording medium 124. A divergence angle θd2 of the output narrow range signal light Lfs may be the same as a convergence angle θc2 with which when the narrow range signal light Lfs was recorded. An output direction d2' of the output narrow range signal light Lfs may be the same as the incidence direction d2 with which the narrow range signal light Lfs was recorded. The narrow range signal light Lfs that reacts only with light having the same characteristic as the reference light Lfr with which the signal light Lfs was recorded may be output but may not be output with respect to light having a different characteristic from the reference light Lfr. Therefore, steering information of the narrow range signal light Lfs output from the hologram recording medium 124 may be specified as the incidence direction d2 and the convergence angle θc2 of the narrow range signal light Lfs incident on the hologram recording medium 124, and the narrow range signal light Lfs may be output only by light having a specific characteristic.

Figure 5:
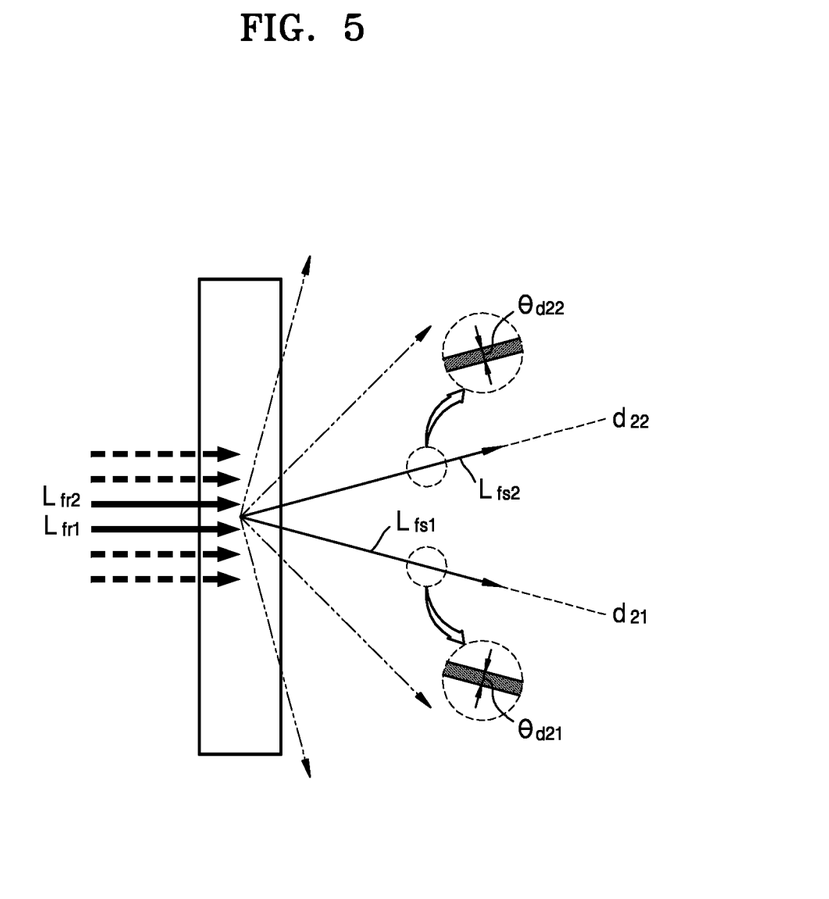
FIG. 5 is a reference diagram for explaining a method of scanning the external environment by using a plurality of narrow range signal light beams according to an exemplary embodiment.

FIG. 5 is a reference diagram for explaining a method of scanning an external environment using a plurality of narrow range signal light beams Lfs according to an exemplary embodiment. The plurality of narrow range signal light beams having different steering information may be recorded on the hologram recording medium 124 shown in FIG. 5. When a plurality of reference light beams having different characteristics are irradiated to the hologram recording medium 124 of FIG. 5, the narrow range signal light Lfs that respectively reacts with each reference light among the plurality of narrow range signal light beams Lfs may be diffracted and output. When the plurality of reference light beams having different characteristics are sequentially incident on the hologram recording medium 124 one by one, the plurality of narrow range signal light beams Lfs that respectively react with the reference light beams may be sequentially output one by one. Each of the plurality of narrow range signal light beams Lfs may have different steering information, and may be output in an output direction and a divergence angle corresponding to the steering information. In an exemplary embodiment, when an n-th reference light beam Lfr1 is incident on the hologram recording medium 124, a first narrow range signal light beam Lfs1, recorded by forming an interference pattern together with the n-th reference light beams Lfr1, may be output in an n-th output direction d21 and an n-th divergence angle θd21. When an n+1th reference light beams Lfr2, having a different characteristic from the n-th reference light beams Lfr1, is incident on the hologram recording medium 124, a second narrow range signal light beams Lfs2, recorded by forming an interference pattern together with the +1th reference light beam Lfr2, may be output in an n+1th output direction d22 and an n+1th divergence angle θd22. The n+1th output direction d22 may be different from the nth output direction d21. The n-th divergence angle θd21 and the n+1th divergence angle θd22 may be the same or different, whereas both the n-th divergence angle θd21 and the n+1th divergence angle θd22 may be greater than a reference angle.

In an exemplary embodiment, the hologram recording medium 124 may output 300 narrow range signal light beams, each having an angle of 0.1 degrees with respect to an output direction between the neighboring narrow range signal light beams and a divergence angle θd of 0.1 degrees or more, and thus an external environment of about 30 degrees in a forward direction may be scanned. The number of the narrow range signal light beams and steering information may be determined adjusted as desired.

Figure 6A:
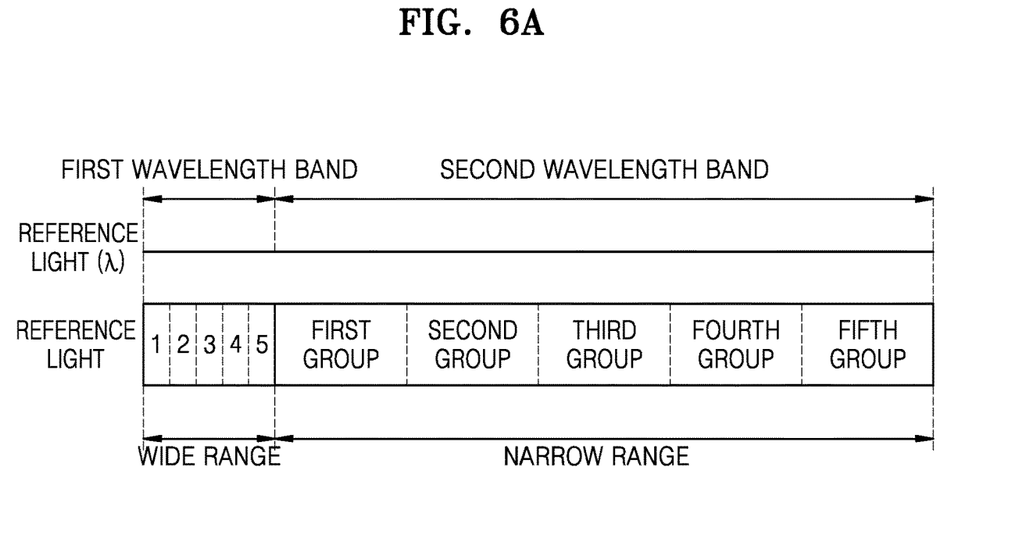
FIG. 6A is a diagram for explaining a relationship between reference light and signal light according to an exemplary embodiment.
Figure 6B:
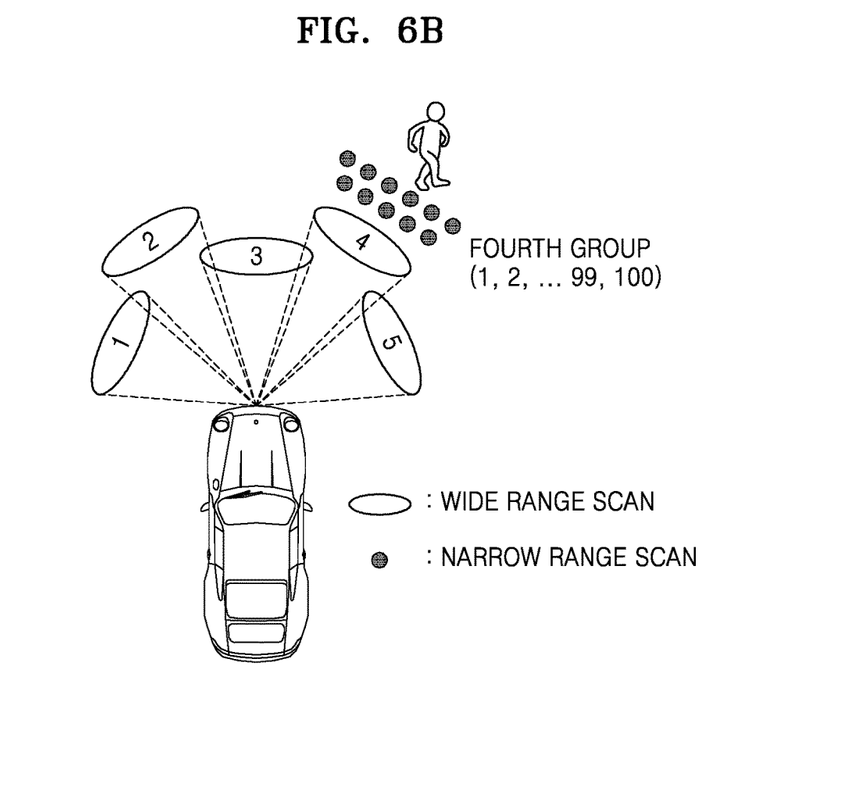
FIG. 6B is a diagram illustrating an example in which signal light scans the external environment according to an exemplary embodiment.

FIG. 6A is a diagram for explaining a relationship between reference light and signal light according to an exemplary embodiment. FIG. 6B is a diagram illustrating an example in which signal light scans an external environment according to an exemplary embodiment. A plurality of wide range signal light beams and a plurality of narrow range signal light beams may be recorded on the hologram recording medium 124. The wide range signal light beams and the narrow range signal light beams may be output to be recorded by reference light having a different wavelength. In an exemplary embodiment, the wide range signal light beams may be recorded and output by reference light of a first wavelength band, and the narrow range signal light beams may be recorded and output by a reference beams of a second wavelength band. The wide range signal light beams may be classified into first to fifth wide range signal light beams according to an output region, and the narrow range signal light beams may be allocated to output regions of the wide range signal light beams and classified into first to fifth narrow range signal light groups.

Even though the wide range signal light beams and the narrow range signal light beams have different ranges of a divergence angle and output direction, the wide range signal light beams and the narrow range signal light beams may be recorded together on the hologram recording medium 124 and may be output by reference light having a different characteristic. Thus, the wide range signal light beams and the narrow range signal light beams may be easily output.

Figure 7:
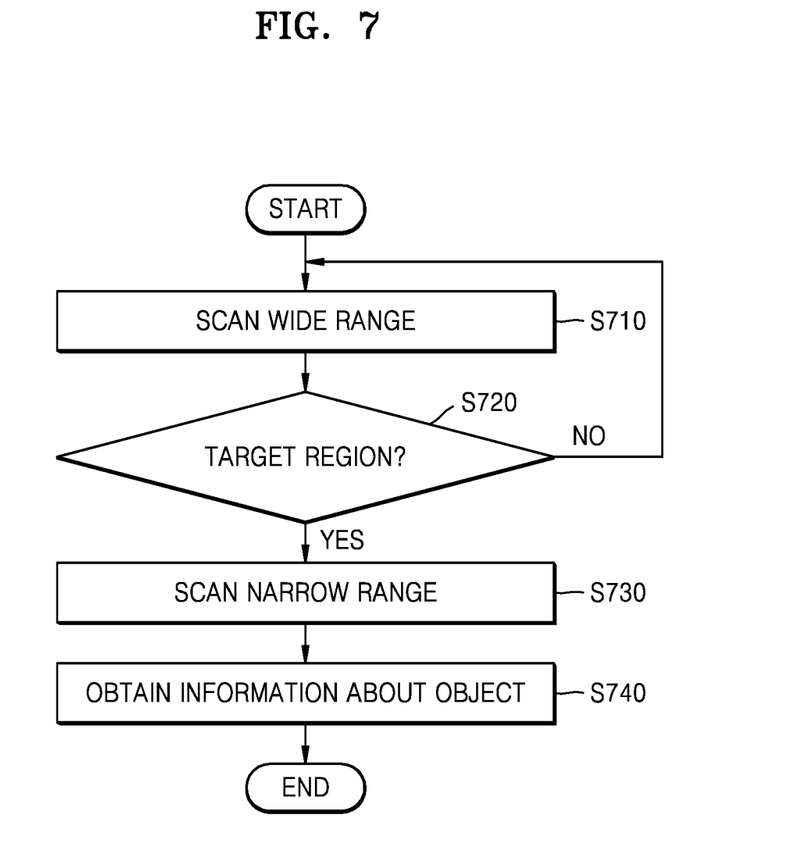
FIG. 7 is a flowchart for explaining a method of scanning the external environment using signal light according to another exemplary embodiment.

Also, an external environment may be scanned more efficiently by using the wide range signal light beams and the narrow range signal light beams together. FIG. 7 is a flowchart for explaining a method of scanning an external environment using signal light according to another exemplary embodiment. Referring to FIG. 7, the scanning device 120 may extensively scan the external environment using the wide range signal light Lbs (S710). The light source 122 may output a plurality of reference light beams having different wavelengths. The hologram recording medium 124 may output a plurality of wide range signal light beams having different steering information that reacts with the wavelengths of the plurality of reference light beams. When the plurality of reference light beams having different wavelengths output from the light source 122 are sequentially incident on the hologram recording medium 124 one by one, the hologram recording medium 124 may sequentially output a plurality of wide range signal light beams having different steering information. The plurality of wide range signal light beams may be sequentially output in a specific direction. In an exemplary embodiment, when the reference light beams are sequentially output by the light source 122 in a direction with a large wavelength, the hologram recording medium 124 may sequentially output first through fifth wide range signal light beams such that the output direction d changes clockwise.

The processing device 140 may determine a target region in which an object exists in the external environment using the wide range signal light Lbs (S720). The processing device 140 may detect a light scattered or reflected by the object among the plurality of wide range signal light beams output as unique steering information and determine a target region of the external environment by using a peak of an electrical signal corresponding to the detected light. In an exemplary embodiment, the processor 144 may determine a wide range signal light corresponding to an electrical signal of which a number of peaks is equal to or greater than a reference number, and also determine the target region using steering information of the determined wide range signal light. In an exemplary embodiment, when the obtained number of peaks from an electrical signal corresponding to light reflected in a fourth region in FIG. 6B is equal to or greater than the reference number, the processor 144 may determine the fourth region as the target region.

The scanning device 120 may scan the target region using a narrow range signal light (S730). In an exemplary embodiment, when it is determined that the fourth region of FIG. 6B is the target region, the processor 144 may control the light source 122 to output the narrow range signal light to the target region. The light source 122 may cause a reference light having a wavelength that reacts with the narrow range signal light that may be output to the target region to be incident on the hologram recording medium 124. The hologram recording medium 124 may output a fourth narrow range signal light Lfs that reacts with a light incident from the light source 122.

The processing device 140 may acquire information about the object based on the narrow range signal light Lfs (S740). The processor 144 may determine a position of the object by determining a narrow range signal light corresponding to the detected peak, and may also determine distance information about the object, i.e., depth information of the object, based on a detection time of the peak and an output time of the narrow range signal light output from the scanning device 120.

Even though the wide range signal light and the narrow range signal light have different divergence angles and output directions, the wide range signal light and the narrow range signal light may be recorded together on the same hologram recording medium 124 and may be output by reference light having different characteristics. Also, the wide range signal light beams and the narrow range signal light beams may be easily output and a structure of the scanning device 120 may be simple. Further, not all narrow range signal light beams may be output and only a narrow range signal light beam corresponding to the target region in which the object exists may be output. Thus, the external environment may be scanned more efficiently.

Figure 8A:
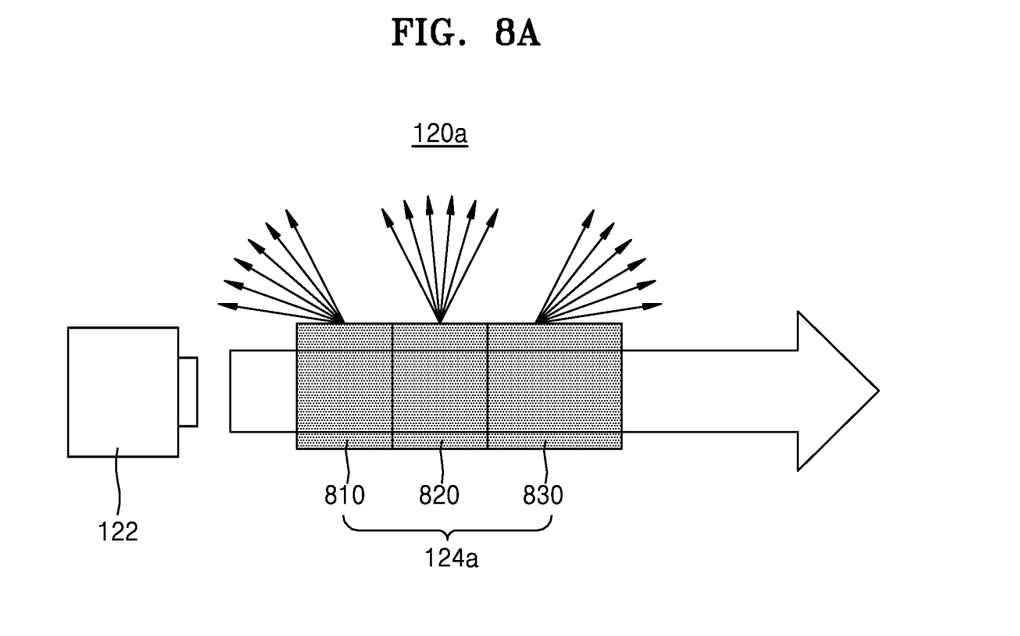
FIGS. 8A and 8B are diagrams showing a scanning device including a plurality of hologram recording media.
Figure 8B:
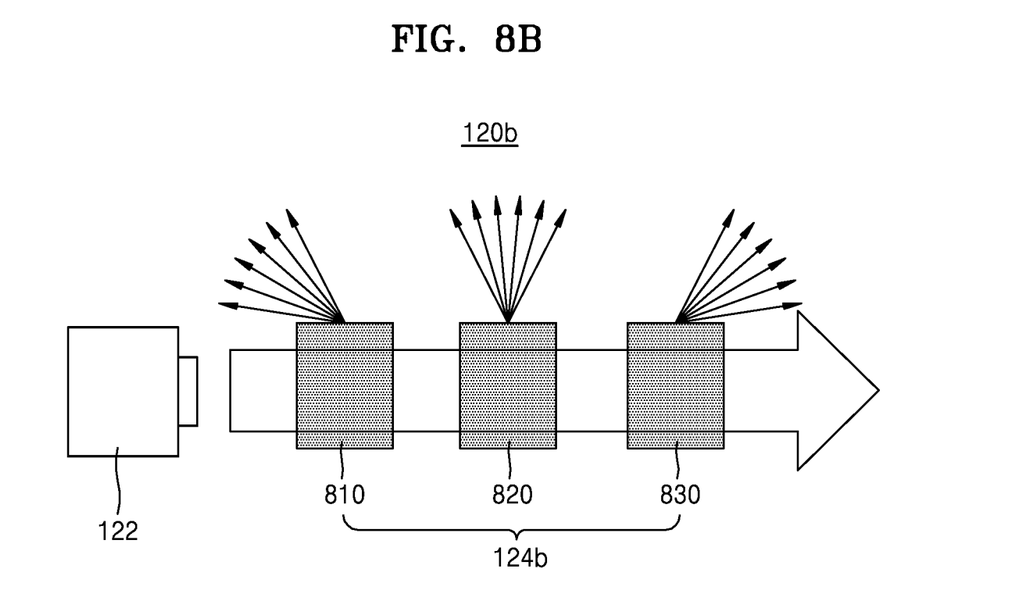

A hologram recording medium or a plurality of hologram recording media may be used according to an exemplary embodiment. FIGS. 8A and 8B are diagrams showing a scanning device 120b including a plurality of hologram recording media 810, 820, and 830. As shown in FIG. 8A, the plurality of hologram recording media 810, 820, and 830 may be disposed to be in contact with each other. Alternatively, as shown in FIG. 8B, the plurality of recording media 810, 820, and 830 may be spaced apart from one other. Alternatively, although not shown in the figure, some of the plurality of recording media 810, 820, and 830 may be arranged to in contact with one other and the others may be spaced apart from each other. The operation principle of the plurality of hologram recording media 810, 820, and 830 may be the same as described above.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A beam steering method comprising:
making first reference light, having a first characteristic, incident on a hologram recording medium on which signal light is holographically recorded, wherein the signal light comprises a first signal light group comprising a plurality of first signal light beams having first steering information and recorded using the first reference light and a second signal light group comprising a plurality of second signal light beams having second steering information, different from the first steering information and recorded using a second reference light, based on the first reference light incident on the hologram recording medium, outputting, to an external environment, the first signal light group comprising the plurality of first signal light beams, and determining a target region in the external environment within which an object exists using the output first signal light group; and
subsequent to the determining of the target region, making the second reference light, having a second characteristic different from the first characteristic, incident on the hologram recording medium, thereby outputting, to the target region, the second signal light group comprising the plurality of second signal light beams to obtain information about the object that exists in the target region.

2. The beam steering method of claim 1, wherein an output direction of each of the first signal light beams varies according to the first characteristic of the first reference light.

3. The beam steering method of claim 1, wherein the first characteristic and the second characteristic each comprise at least one of a wavelength and a phase of light.

4. The beam steering method of claim 1, wherein the information about the object comprises at least one of an absence or a presence of the object, a position of the object, and distance information about the object.

5. The beam steering method of claim 1, wherein the hologram recording medium is configured to output at least one of:
the first signal light group comprising the plurality of first signal light beams having divergence angles greater than a reference angle, and
the second signal light group comprising the plurality of second signal light beams having divergence angles less than the reference angle.

6. The beam steering method of claim 5, wherein the outputting the first signal light group comprises scanning the external environment by outputting the plurality of first signal light beams included in the first signal light group in different output directions.

7. The beam steering method of claim 5, wherein the outputting the first signal light group comprises sequentially outputting, one by one, the plurality of first signal light beams included in the first signal light group.

8. The beam steering method of claim 5, wherein the outputting the second signal light group comprises scanning the target region by outputting the plurality of second signal light beams included in the second signal light group in different output directions.

9. The beam steering method of claim 8, further comprising obtaining distance information about the object using the output second signal light group.

10. A beam steering device comprising:
a light source configured to output reference light comprising first reference light having a first characteristic and second reference light having a second characteristic, different from the first characteristic;
a hologram recording medium on which signal light is holographically recorded, wherein the signal light comprises a first signal light group comprising a plurality of first signal light beams and having first steering information and recorded using the first reference light and a second signal light group comprising a plurality of second signal light beams and having second steering information and recorded using the second reference light; and
a processor configured to obtain information about an object existing in an external environment based on the signal light,
wherein the hologram recording medium is configured to scan the external environment by outputting, to the external environment, the first signal light group having the first steering information at a divergence angle corresponding to the first characteristic of the first reference light when the first reference light is made incident on the hologram recording medium,
wherein the processor is further configured to determine a target region in the external environment within which the object exists using the output first signal light group, and
wherein subsequent to the determining of the target region, the processor is further configured to control the light source to make the second reference light incident on the hologram recording medium, thereby outputting, to the target region, the second signal light group to obtain information about the object that exists in the target region.

11. The beam steering device of claim 10, wherein an output direction of each of the first signal light beams varies according to the first characteristic of the first reference light.

12. The beam steering device of claim 10, wherein the hologram recording medium is further configured to output the second signal light group having the second steering information when the second reference light is made incident on the hologram recording medium.

13. The beam steering device of claim 10, wherein the first characteristic and the second characteristic each comprise at least one of a wavelength and a phase of light.

14. The beam steering device of claim 10, wherein the first steering information and the second steering information each comprise at least one of an output direction and a divergence angle.

15. The beam steering device of claim 10, wherein the hologram recording medium is configured to output at least one of:
the first signal light group comprising the plurality of first signal light beams having divergence angles greater than a reference angle, and
the second signal light group comprising the plurality of second signal light beams having divergence angles less than the reference angle.

16. The beam steering device of claim 15, wherein the hologram recording medium is configured to output the plurality of first signal light beams in different output directions.

17. The beam steering device of claim 15, wherein the processor is further configured to obtain distance information about the object based on the second signal light group.

18. The beam steering device of claim 10, wherein the information about the object comprises at least one of an absence or a presence of the object, a position of the object, and distance information about the object.

* * * * *